(12) United States Patent
Varner et al.

(10) Patent No.: US 7,227,469 B2
(45) Date of Patent: Jun. 5, 2007

(54) SURGICAL INSTRUMENT TRAY SHIPPING TOTE IDENTIFICATION SYSTEM AND METHODS OF USING SAME

(75) Inventors: Robert Varner, Germantown, TN (US); Steven M. Tethrake, North Webster, IN (US); Jeffrey H. Nycz, Collierville, TN (US)

(73) Assignee: SDGI Holdings, Inc., Wilmington, DE (US)

( * ) Notice: Subject to any disclaimer, the term of this patent is extended or adjusted under 35 U.S.C. 154(b) by 270 days.

(21) Appl. No.: 10/993,487

(22) Filed: Nov. 22, 2004

(65) Prior Publication Data

US 2006/0109105 A1 May 25, 2006

(51) Int. Cl.
*G08B 13/14* (2006.01)
(52) U.S. Cl. .................................. 340/572.1; 340/676
(58) Field of Classification Search ............... 340/676, 340/571.2; 128/604; 235/375, 385
See application file for complete search history.

(56) References Cited

U.S. PATENT DOCUMENTS

| | | | |
|---|---|---|---|
| 4,075,632 A | 2/1978 | Baldwin et al. | |
| 4,360,801 A | 11/1982 | Duhame | |
| 4,390,880 A | 6/1983 | Henoch | |
| 4,688,026 A | 8/1987 | Scribner et al. | |
| 4,739,328 A | 4/1988 | Koelle et al. | |
| 5,030,807 A | 7/1991 | Landt et al. | |
| 5,621,199 A | 4/1997 | Calari et al. | |
| 5,923,001 A | 7/1999 | Morris et al. | |
| 5,963,134 A | 10/1999 | Bowers et al. | |
| 6,158,437 A | 12/2000 | Vagley | |
| 6,164,738 A | 12/2000 | Dane et al. | |
| 6,193,160 B1 * | 2/2001 | Zembitski | 235/472.01 |
| 6,318,636 B1 | 11/2001 | Reynolds et al. | |
| 6,405,863 B1 | 6/2002 | Dhindsa | |
| 6,415,978 B1 | 7/2002 | McAllister | |
| 6,426,041 B1 | 7/2002 | Smith | |
| 6,429,776 B1 | 8/2002 | Alicot et al. | |
| 6,480,101 B1 | 11/2002 | Kelly et al. | |

(Continued)

OTHER PUBLICATIONS

Presentation by Innovision Research and Technology, PLC at the "RFID in Healthcare" conference in Washington, DC. on Dec. 2 and 3, 2003.

(Continued)

*Primary Examiner*—Jeffery Hofsass
*Assistant Examiner*—Shirley Lu
(74) *Attorney, Agent, or Firm*—Hunton & Williams

(57) ABSTRACT

A surgical instrument tray shipping tote identification system is provided. During transit to or from a medical facility, processing center, distribution center or other location, multiple surgical instruments trays are placed in an instrument tray shipping tote. Each instrument tray includes at least one RFID transponder tag storing identification information about that tray. The shipping tote has a bar coded shipping label affixed to one surface generated at the point of origin. When the tote arrives at the distribution center, it is placed on a conveyor system that includes a reading station having an RFID transceiver and a bar code reader. Information read from the RFID transponder tags and the bar code label is transmitted by a controller to an external database to check for any off-nominal status indicators. Once this check is performed, an indication is sent back to the controller and an appropriate indicator on the identification system is activated.

27 Claims, 8 Drawing Sheets

U.S. PATENT DOCUMENTS

| | | |
|---|---|---|
| 6,523,752 B2 | 2/2003 | Nishitani et al. |
| 6,646,241 B1 | 11/2003 | Varma et al. |
| 6,669,089 B2 | 12/2003 | Cybulski et al. |
| 6,777,623 B2 | 8/2004 | Ballard |
| 6,825,766 B2 | 11/2004 | Hewitt et al. |
| 6,853,303 B2 | 2/2005 | Chen et al. |
| 6,861,954 B2 | 3/2005 | Levin |
| 6,866,147 B2 | 3/2005 | Barwick |
| 7,012,529 B2 * | 3/2006 | Sajkowsky ............... 340/572.1 |
| 2002/0032435 A1 | 3/2002 | Levin |
| 2002/0063622 A1 | 5/2002 | Armstrong et al. |
| 2002/0105424 A1 | 8/2002 | Alicot et al. |
| 2002/0143320 A1 | 10/2002 | Levin |
| 2002/0188259 A1 | 12/2002 | Hickle et al. |
| 2003/0164401 A1 | 9/2003 | Andreasson et al. |
| 2003/0174099 A1 | 9/2003 | Bauer et al. |
| 2003/0189094 A1 | 10/2003 | Trabitz |
| 2003/0196837 A1 | 10/2003 | Ballard |
| 2004/0008123 A1 | 1/2004 | Carrender et al. |
| 2004/0022227 A1 | 2/2004 | Lynch et al. |
| 2004/0031626 A1 | 2/2004 | Morris et al. |
| 2004/0069851 A1 | 4/2004 | Grunes et al. |
| 2004/0100384 A1 | 5/2004 | Chen et al. |
| 2004/0160233 A1 | 8/2004 | Forster |
| 2004/0174244 A1 | 9/2004 | Eidemiller |
| 2004/0174261 A1 | 9/2004 | Volpi et al. |
| 2004/0220602 A1 | 11/2004 | Deng et al. |
| 2004/0220860 A1 | 11/2004 | Persky et al. |
| 2004/0250819 A1 | 12/2004 | Blair et al. |
| 2004/0267297 A1 | 12/2004 | Malackowski |
| 2005/0003757 A1 | 1/2005 | Anderson |
| 2005/0012617 A1 | 1/2005 | DiSilvestro et al. |

OTHER PUBLICATIONS (http://rfidjournal.com/article/view/112) RFID Journal, Can RFID Cure Healthcare's Ills?, Nov. 12, 2002.

(http://usatoda.printthis.clickability.com/pt/cpt?action=cpt&expire=&urlID=8067862&fb=...) Svensson, Peter "Conductive ink advances electronics," USATODAY.com—(New York) pp. 1-3.

(http://www.eetimes.com/showPressRelease.jhtml?articleID=57907) EE Times (www.eetimes.com) "T-Ink™ Unique Conductive Ink Technology to Be Featured" Feb. 14, 2003, pp. 1-2.

(http://americanprinter.com/microcites/magazinearticle.asp?mode=print&magazinearticleid...) American Printer (www.americanprinter.com) "Tracking RFID Progress" Jan. 1, 2004, pp. 1-3.

(http://pffc-online.com/microsites/newsarticle.asp?mode=print&newsarticleid=2708965&re) Byrd-Thompson, Nsenga, (PFFC) Paper Film & Foil Converter (www.pffc-online.com), "RFID and Conductive Inks: What You Need To Know" pp. 1-3.

* cited by examiner

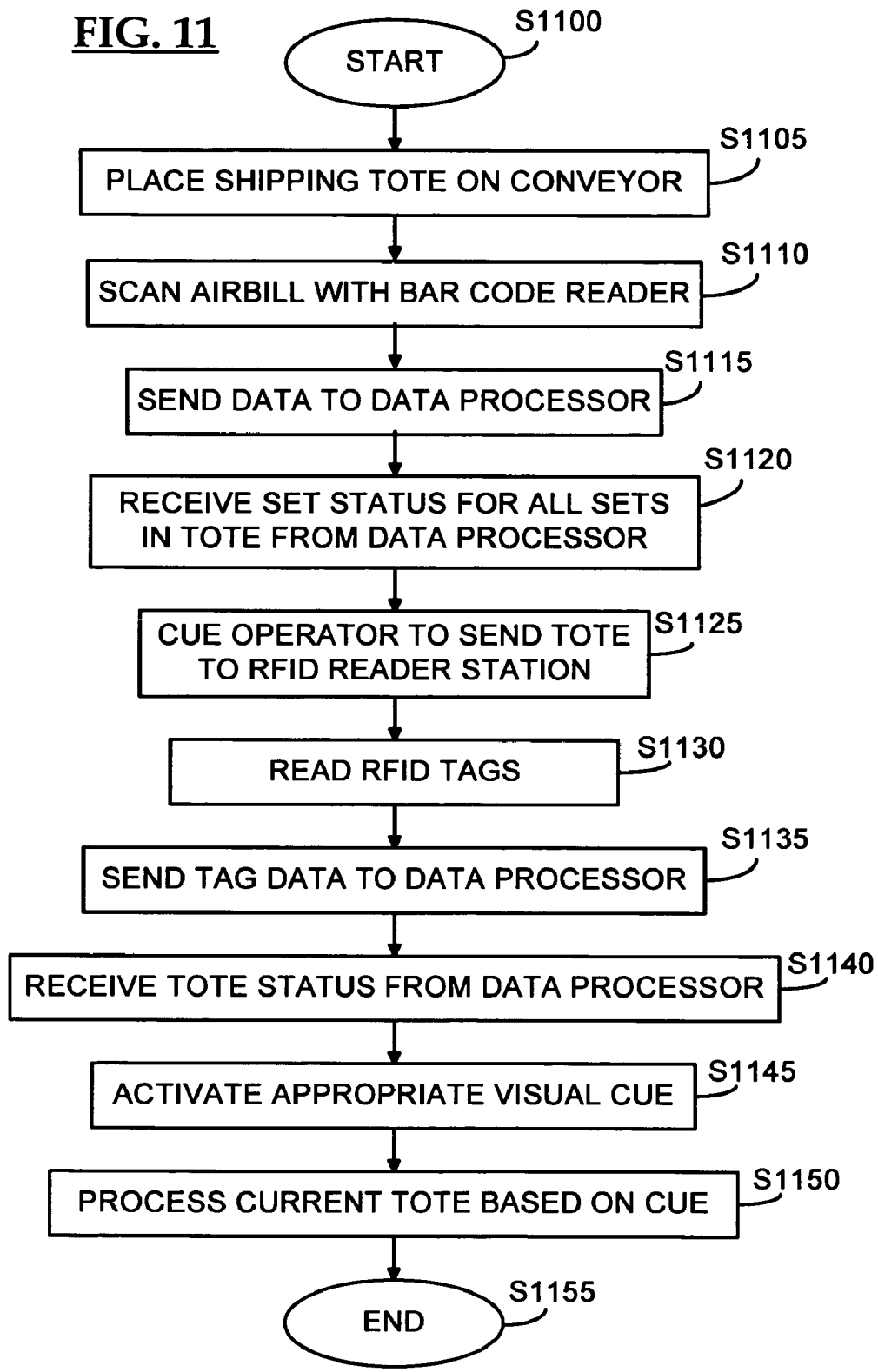

SURGICAL INSTRUMENT TRAY SHIPPING TOTE IDENTIFICATION SYSTEM AND METHODS OF USING SAME

FIELD OF THE INVENTION

The invention relates generally to systems and methods for computer assisted wireless identification techniques, and more particularly to systems and methods for wirelessly identifying surgical instrument shipping totes using a combination RFID apparatus and bar code identification system in order to facilitate tracking, routing and processing of surgical instrument trays.

BACKGROUND OF THE INVENTION

Surgical instrument storage and sterilization systems are known. These systems, known as surgical instrument trays or surgical instrument kits, typically consist of metal or plastic trays that hold a variety of general purpose and/or procedure specific surgical instruments such as forceps, scissors, clamps, retractors, scalpels, etc. These trays are brought into the operating room (OR) when preparing for surgery, and also are used as a means to organize, transport and store surgical instruments in a medical facility. For the purposes of this disclosure and claims, the terms "surgical instrument kit", "surgical instrument tray", "surgical kit", "surgical tray", "kit" and "tray" will be used interchangeably to refer to devices used in the medical industry to hold, house and transport multiple surgical instruments.

A primary function provided by surgical trays, in addition to storage, is to facilitate group sterilization. Sterilization is of paramount importance in a surgical setting such as a hospital to prevent potentially deadly infections to patients undergoing surgery. Prior to every surgical procedure, all surgical instruments and trays must be sterilized. Also, following each surgical procedure, all instruments on a given tray, if not wrapped separately, whether soiled or not, must be re-sterilized before subsequent usage. In order to increase the speed and efficiency of sterilization, entire surgical trays containing several instruments often are placed in a sterilization chamber at once. The sterilization chamber may provide any combination of heat, pressure, and/or fluid or vaporous sterilant to the trays and all the instruments contained therein. Sterilization techniques are well known. Thus, a detailed discussion of them has been intentionally omitted.

Because of the need to perform sterilization and the general need to maintain surgical instruments kits in good working order, they are often transported in and out of medical facilities through a distribution center for processing. For example, a group of surgical instrument kits may be picked up from a hospital at one time. In order to easily and efficiently transport the kits, several kits are placed in a single shipping tote. The shipping tote is a large bin, usually made of plastic or other durable lightweight material and able to securely hold two or more instrument kits inside. A worker then may load the shipping totes into a truck thereby reducing the number of manual operations that must be performed. Before transporting each shipping tote, a bar coded shipping label is prepared that identifies certain information such as the point of origin, the destination, and possibly the contents of the tote, i.e., the identification number of each surgical instrument tray contained in the tote. The bar coded label allows the tote to be easily and efficiently tracked and entered into inventory at the receiving facility.

While bar code labels work well for shipping labels, they are not well suited as a means for identifying surgical instrument trays themselves. Typically, in order to identify instrument trays, a worker will have to physically inspect each instrument tray for an identification number or even identify each tray from memory in order to accurately record intake of the tray during processing. As noted above, bar code labels are not practical in this application because they can not hold up to the rigors of sterilization. Moreover, they require line of sight in order to be read, further increasing processing and handling time by the person attempting to identify them. A promising memory device-based product identification technology that ameliorates some of these noted deficiencies of bar coded labels is that of radio frequency identification (RFID) technology. RFID systems use an RF field generator and a plurality of RFID tags attached to goods and products to store and retrieve information about the goods and products. RFID tags are miniature electronic circuits that store identification information about the products they are attached to. An RFID tag typically includes a memory for storing data, an antenna, an RF transmitter, and/or an RF receiver to transmit data, and logic for controlling the various components of the memory device. The basic structure and operation of RFID tags can be found in, for example, U.S. Pat. Nos. 4,075,632, 4,360,801, 4,390,880, 4,739,328 and 5,030,807, the disclosures of which are hereby incorporated by reference in their entirety.

RFID tags generally are formed on a substrate and can include, for example, analog RF circuits and digital logic and memory circuits. The RFID tags also can include a number of discrete components, such as capacitors, transistors, and diodes. The RF transmission of data can be accomplished with modulated back scatter as well as modulation of an active RF transmitter. These RFID tags typically come in one of two types: active or passive. Active tags are characterized in that they have their own power source, such as a battery. When they enter an RF field they are turned on and then emit a signal containing their stored information. Passive tags do not contain a discrete power source. Rather, they become inductively charged when they enter an RF field. Once the RF field has activated the passive circuit, they emit a signal containing their stored information. Passive RFID tags usually include an analog circuit that detects and decodes the interrogating RF signal and that provides power from the RF field to a digital circuit in the tag. The digital circuit generally executes all of the data functions of the RFID tag, such as retrieving stored data from memory and causing the analog circuit to modulate to the RF signal to transmit the retrieved data. In addition to retrieving and transmitting data previously stored in the memory, both passive and active dynamic RFID tags can permit new or additional information to be stored in the RFID tag's memory, or can permit the RFID tag to manipulate data or perform some additional functions. By attaching or integrating an RFID transponder tag in each surgical instrument tray, the tray can be identified wirelessly without requiring precise manual manipulation because RF waves can penetrate surfaces impervious to light. Thus, they do not require line of sight in order to be read and can be encapsulated into ruggedized containers. Another advantage is that a group of tags placed within the influence of an RFID reader can read nearly simultaneously. Yet another advantage of RFID tags is that with dynamic tags, the stored information can be updated using a suitable reader/writer device, allowing them to serve as transactional records.

The description herein of various advantages and disadvantages associated with known apparatus, methods, and materials is not intended to limit the scope of the invention to their exclusion. Indeed, various embodiments of the invention may include one or more of the known apparatus, methods, and materials without suffering from their disadvantages.

SUMMARY OF THE INVENTION

Thus, there exists a need to provide an inventory management system for surgical instrument trays and surgical instrument tray shipping totes that reduces handling costs and provides accurate and rapid tracking of instrument trays.

Embodiments of the present invention mitigate or solve the above-identified limitations in known solutions, as well as other unspecified deficiencies in known solutions. A number of advantages associated with various embodiments of the present invention are readily evident to those skilled in the art, including economy of design and resources, transparent operation, cost savings, etc. Various exemplary embodiments according to the methods and apparatus of the present invention allow for lower handling costs of surgical instruments, increased accuracy of the verification process of data pertaining to each instrument tray and shipping tote with a reduction of human contact, and provide real-time data collection resulting in fast data acquisition, which ultimately speeds up inventory updating of such instrument trays and totes.

In accordance with one embodiment of the present invention, an apparatus for identifying surgical instrument trays and surgical instrument tray shipping totes is provided. The apparatus according to this embodiment comprises a chassis that includes a conveyor system defining a path of travel that is supported by the chassis. The apparatus according to this embodiment also includes a reading station attached to a frame and located along the path of travel. The reading station comprises an RFID transceiver, a bar code reader, an indicator, and a controller. In this embodiment, the conveyor system transports a shipping tote containing one or more surgical instrument kits past the reading station so that the bar code scanner and RFID reader can obtain information from the tote and instrument kits respectively. The controller then conveys this information to an electronic database stored on a computer.

Another exemplary embodiment of the invention provides a method for identifying surgical instrument trays and surgical instrument tray shipping totes. The method according to this embodiment comprises placing a surgical instrument tray shipping tote containing one or more surgical instrument trays on a conveyor system defined by a conveyor path, activating an RFID reader along the path to read information from an RFID transponder tag associated with each of the one or more surgical instrument trays contained in the shipping tote, activating a bar code reader also along the path to read information from a bar-coded shipping label affixed to a surface of the shipping tote, comparing the information read by the RFID reader and the bar code reader with previously stored information, and activating an indicator located on the path based on the step of comparing.

In another exemplary embodiment, a method of identifying surgical instrument kits and surgical instrument kit shipping totes is provided. The method according to this embodiment comprises affixing a bar-coded shipping label to a surface of a surgical instrument shipping tote containing one or more surgical instrument kits, each surgical instrument kit comprising an RFID transponder tag, placing the surgical instrument shipping tote on a conveyor system, operating the conveyor system to move the shipping tote past an RFID transceiver and a bar code reader at a reading station, obtaining first identification information from the RFID reader when the tote enters the reading station, obtaining second identification information from the bar code reader corresponding to the shipping tote and its contents, comparing the obtained first and second identification information with previously stored information, and activating an indicator based on the results of the comparison.

In yet one additional embodiment according to this invention, an apparatus for identifying and processing of surgical instrument kits and surgical instrument kit shipping totes is provided. The apparatus according to this embodiment comprises a conveyor system supported by a frame. A hand held bar code reader is attached to the frame. The apparatus according to this embodiment is comprises a hand held bar code scanner, an RFID reader station, a communications link to an external data processing system and a visual display operable to provide a visual cue regarding the processing of a surgical instrument shipping tote to an operator of the apparatus.

In still a further embodiment according to this invention, a method is provided for identifying and processing surgical instrument kits and surgical instrument kit shipping totes. The method according to this embodiment comprises, scanning a bar-coded shipping label affixed to a surgical instrument shipping tote with a hand held bar code reader attached to or in communication with an shipping tote processing apparatus, transferring the bar code information to an external data processing system over a communications link, receiving a response from the external data processing system over the communications link, activating an RFID reading station on the processing apparatus, conveying the shipping tote to the reading station, reading the contents of RFID transponder tags associated with surgical instrument kits contained in the shipping tote, transferring this read information to the data processing system, receiving a status indication from the data processing system regarding a status of the current shipping tote and displaying a visual cue to the operator of the status so that the current shipping tote can be processed in accordance with its status.

Other aspects and advantages of the invention will become apparent from the following detailed description, taken in conjunction with the accompanying drawings, illustrating by way of example the principles of the invention.

BRIEF DESCRIPTION OF THE DRAWINGS

Purposes and advantages of the present invention will be apparent to those of ordinary skill in the art from the following detailed description in conjunction with the appended drawings in which like reference characters are used to indicate like elements, and in which:

FIG. 11 is a flow chart detailing the steps of a method for checking in a surgical instrument kit shipping tote a with a surgical instrument kit shipping tote identification system according to embodiments of this invention illustrated in FIG. 10.

DETAILED DESCRIPTION OF THE DISCLOSURE

Figure 1:
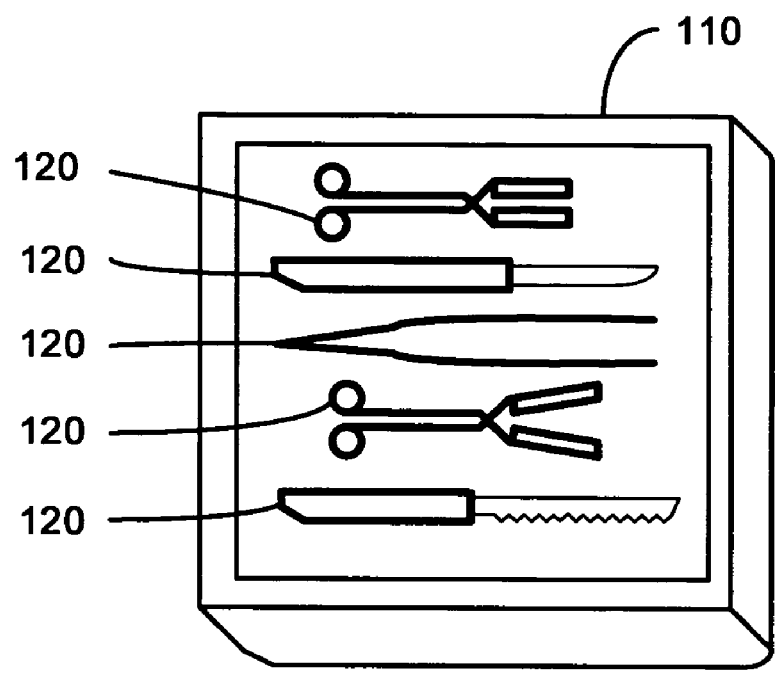
FIG. 1 is a schematic drawing illustrating a surgical instrument tray according to various exemplary embodiments of this invention.

The following description is intended to convey a thorough understanding of the invention by providing specific embodiments and details involving automating tracking and processing of surgical instrument kits and shipping totes for surgical instrument kits. It is understood, however, that the invention is not limited to these specific embodiments and details, which are exemplary only. It further is understood that one possessing ordinary skill in the art, in light of known systems and methods, would appreciate the use of the invention for its intended purposes and benefits in any number of alternative embodiments, depending upon specific design and other needs.

In various exemplary embodiments, the inventive apparatus comprises a conveyor-type workstation apparatus having an substantially planar elevated conveyor surface mounted to a frame that is sufficiently wide to accommodate at least one surgical instrument tray shipping tote. In various exemplary embodiments, the frame holding the conveyor is attached to two or more legs that elevate it to a height that is sufficiently tall to be comfortably accessed by a person standing or unloading a shipping tote from a vehicle. Alternatively, in various other exemplary embodiments, the workstation apparatus of the present invention may be retrofitted to an existing table or other elevated surface. In various exemplary embodiments, the workstation apparatus contains a reading station mounted to the frame. The reading station comprises an RF transceiver that projects an RF field on to a portion of the conveyor path through one or more RF antennae, and that can receive data signals from one or more RFID tags within the RF field. In a preferred embodiment, the reading station includes at least two RF antennae mounted along either side of the conveyor path operable to project a multi-dimensional RF field on the conveyor path and to receive information signals from RFID transponder tags attached or integral to each surgical instrument tray enclosed in the shipping tote. In various exemplary embodiments, the reading station also includes a bar code reader oriented to read bar code labels affixed to a surface of a shipping tote moving along the conveyor path. In a preferred embodiment, the bar code reader is mounted over the conveyor path to read a bar coded label affixed to the top surface of the shipping tote.

In various exemplary embodiments, the workstation apparatus also contains a data link to a computer database configured to store information read from the RFID tags and bar coded labels and to perform data analysis on read data, including matching read data against stored data. In various exemplary embodiments, the information read from the RFID tags may contain information indicative of the manufacturer, part number, serial number and manufacturing data, usage and maintenance, and the like for the instrument trays in the shipping tote. In various exemplary embodiments, the information from the bar code labels may contain information indicative of the source of the shipping tote, the destination of the shipping tote or even the contents of the shipping tote. In various exemplary embodiments, the workstation apparatus of the present invention also includes a visual indicator, indicating a state of the shipping tote and/or surgical instrument tray(s) contained therein as read by the workstation reader in accordance with at least one predetermined condition. In various exemplary embodiments, the visual indicator includes an LED panel mounted on a surface of the workstation reader and is characterized by a red and green light emitting diode (LED). In various exemplary embodiments, the workstation apparatus includes an audio indicator. In various exemplary embodiments, a printer also is attached to the identification apparatus operable to print a report indicative of the state of the surgical instrument tray and/or surgical instrument tray shipping tote.

In accordance with another embodiment of the present invention, a method is provided for wirelessly identifying surgical instrument kits and surgical instrument kit shipping totes with a workstation apparatus. Information is wirelessly retrieved from the kits and the shipping totes respectively using an RFID transceiver and a bar code reader. In various exemplary embodiments, the method includes placing a shipping tote containing one or more surgical instrument trays on the conveyor surface of the workstation reader apparatus. In various exemplary embodiments, the method generates an RF field with one or more RF transceivers to activate or cause to be activated an RFID tag contained in or attached to each surgical instrument tray in the shipping tote. In various exemplary embodiments, the method also receives a signal from one or more RFID tags containing information about the item that the tag corresponds to, and sends this information to a computer database. In various exemplary embodiments, the method operates a bar code reader to read a bar code from a bar code label affixed to a surface of the surgical instrument kit shipping tote. In various exemplary embodiments, this read information is sent to a computer containing a database and is analyzed in accordance with one or more predetermined conditions.

In various exemplary embodiments, the method of the present invention receives a signal at the RFID workstation reader from the computer indicative of a state of the surgical instrument tray and/or surgical instrument tray shipping tote based on the one or more predetermined conditions, and activates an indicator indicative of that state. In various exemplary embodiments, activating an indicator is accomplished by activating a visual indicator comprising one of a red and a green LED mounted on the reading station. In various exemplary embodiments, the method also includes printing a report based on the state of the surgical instrument tray and/or surgical instrument tray shipping tote to describe the condition of the surgical instrument tray or surgical instrument tray shipping tote.

Various exemplary embodiments of the invention are capable of circumventing some of the problems associated with other manual methods of identifying and tracking surgical instruments trays and surgical instrument shipping totes by using radio frequency tagging of each instrument tray and bar code labeling of each surgical instrument tray shipping tote, placing the shipping tote on a conveyor system of the workstation apparatus and conveying the tote past the RFID reader and bar code reader. The RFID reader and bar code reader are in communication with a computer database that receives the read information and returns a signal to the reader apparatus indicative of a state of the current shipping tote and/or instrument trays contained therein. Using the database and workstation, information may be wirelessly collected and compared to stored data to check shipping totes and instrument trays in and out of a distribution facility and to alert an operator of any off nominal conditions.

Figure 2:
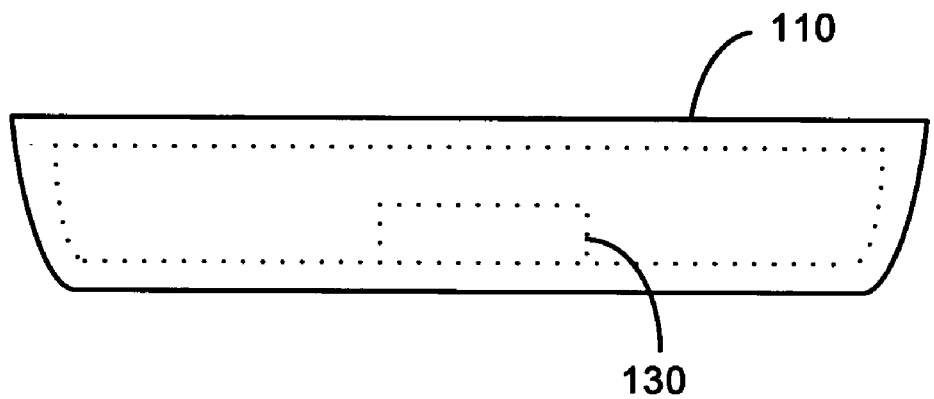
FIG. 2 is a side view perspective of a surgical instrument tray according to various exemplary embodiments of this invention.

Referring now FIGS. 1–2, a surgical instrument tray 110 and a plurality of surgical instruments 120 are illustrated in accordance with various exemplary embodiments. As shown in FIG. 1, the surgical instrument tray comprises a hollowed body having a planar top surface surrounded on its perimeter by a raised lip that prevents instruments from sliding off of the tray. Typically, surgical instrument tray bodies are made of a plastic or other non-corrosive, relatively lightweight material such as titanium or stainless steel. In FIG. 1, the surgical instrument tray is shown as being flat. However, it should be noted that surgical instrument trays may contain one or more recesses to accommodate various surgical instruments. Also, the tray may be configured as a chest with one or more drawers or a hinged door to permit access to the instruments.

As shown in FIG. 2, the surgical instrument tray 110 comprises an embedded RFID transponder tag 130. In various exemplary embodiments the RFID transponder tag 130 will be invisibly mounted on an inside surface of a surgical instrument tray 110 so as to protect the RFID transponder tag 130 from the outside environment. Alternatively, in various other exemplary embodiments, the RFID tag 130 may be mounted on an outside surface of the surgical instrument tray 110 or may even be enclosed in a separate housing and attached to the surgical instrument tray with a contact adhesive, string, cord, wire, tie, or other suitable attachment mechanism. This method of attaching RFID tags will be particularly relevant when retrofitting existing surgical instrument trays. The specific manner by which the RFID transponder tag 130 is affixed to the surgical instrument tray is not critical.

Referring again to FIG. 2, the RFID tag 130 preferably includes a combined receiving and transmitting antenna, and a transceiver, which can contain one or more amplifiers, key means, saw tooth pulse generator, a frequency converter, and electronically programmable, integrated circuit memory. The integrated circuit memory may be a random access memory (RAM). The tag preferably is adapted to deliver stored information to an RFID reading device upon instruction or request therefrom. The storing of information in the memory of the RFID tag can be accomplished in accordance with the procedures set forth in U.S. Pat. No. 4,390,880, the disclosure of which is incorporated by reference herein in its entirety.

In various exemplary embodiments, the RFID transponder tag 130 of the surgical instrument tray 110 will contain information specific to that tray. For example, the RFID transponder tag 130 may contain information including but not limited to the manufacturer of the tray, the manufacturing date, a serial or ID number for the tray, name for the tray (i.e., general surgical kit or cardiac catheterization kit) or list of items to be contained on the tray. In this manner, a list of items that should be on the tray can be compared against those that actually are on the tray. Alternatively, a serial number and/or the name stored in the tag 130 may be used to query a relational database in which the list of instruments belonging to the kit are stored in association with the serial number and/or name. Through the use of an integral or attached RFID transponder tag, the surgical instrument tray may be checked in and out of a distribution center wirelessly. Also, because RF waves can penetrate light impervious materials, an operator need only place the tray within the RF field of a reader rather than positioning it for precise line of sight reading.

Figure 3:
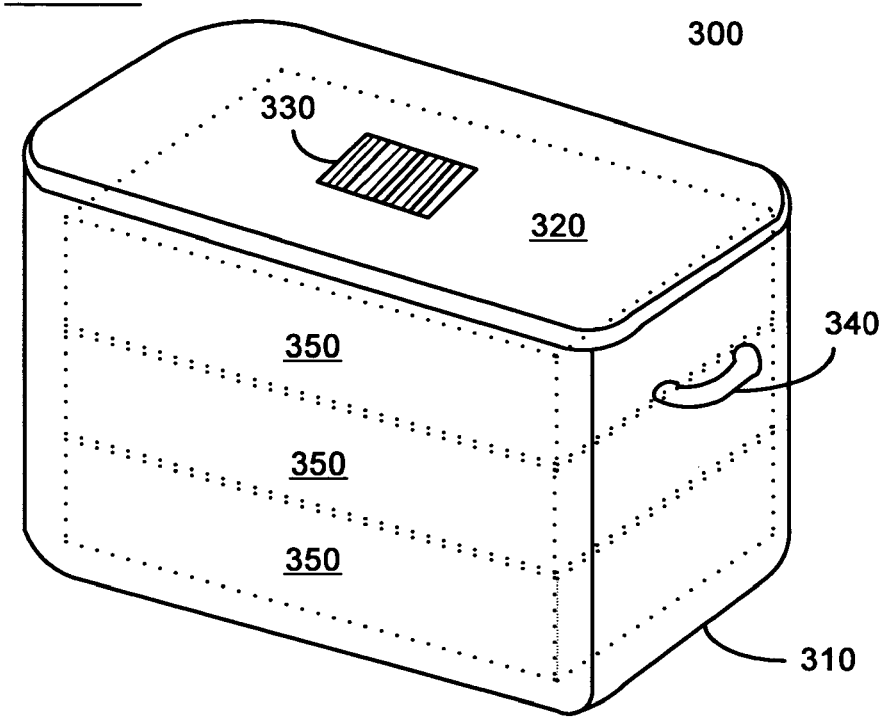
FIG. 3 is a perspective view of a surgical instrument tray shipping tote according to various exemplary embodiments of this invention.
Figure 4:
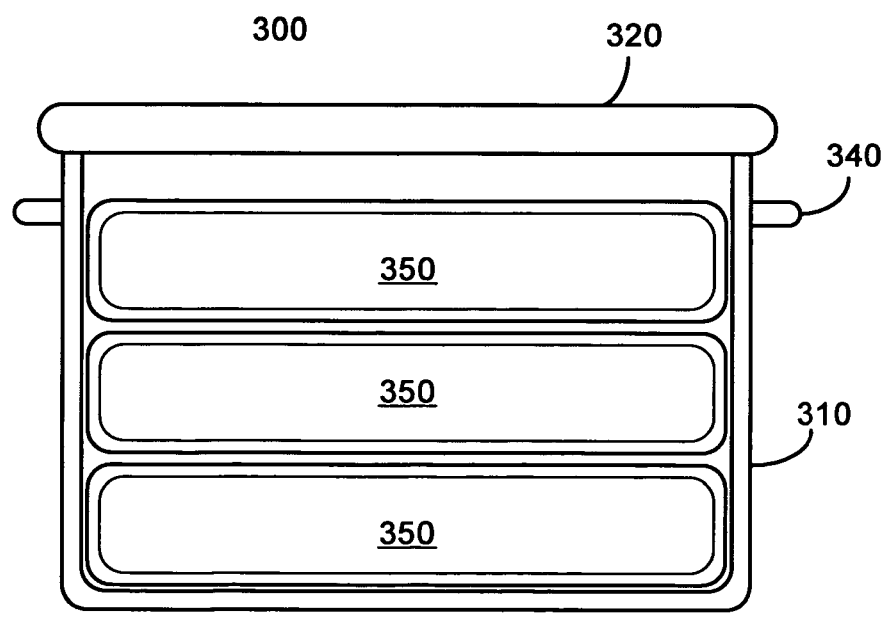
FIG. 4 is a cut away side view of a surgical instrument tray shipping tote according to various exemplary embodiments of this invention.

FIGS. 3 and 4 illustrate various views of a surgical instrument kit shipping tote 300 for transporting quantities of surgical instrument kits in and out of a distribution and processing center in accordance with various embodiments. The shipping tote 300 preferably comprises a main body portion 310, a lid portion 320 including a bar coded shipping label 330, and one or more carrying handles 340. The shipping tote 300 is shown in FIG. 3 as being translucent for purposes of example only. The tote 300 may or may not be constructed of light permeable materials. The specific construction of the shipping tote is not critical. Furthermore, though the lid portion 320 is shown as being a single piece, snap on type lid, other lid types may be utilized. Furthermore, though the bar code label 330 is depicted in FIG. 3 as being located on the top of the shipping tote 300, it should be appreciated that the label may be located on another face, for example the bottom, or the side. Also, though the shipping tote 300 is illustrated in FIGS. 3–4 as being large enough to accommodate three instrument trays, it should be appreciated that it may accommodate more or less then three instrument trays, however, it will generally be preferable to accommodate two or more instrument trays.

FIG. 4 is side cut away view illustrating three surgical instrument kits 350 inside of a shipping tote 300. In one embodiment, the shipping tote 300 will be manufactured to work with a specific brand or size of instrument tray to insure a secure fit within the tote 300. In practical application, a operator will load an empty tote at the medical facility when (s)he picks up surgical instrument kits to take to the distribution center. At that time, he will generate a bar coded shipping label with a computer or hand held terminal and affix the label to a surface of the tote. When the tote arrives at the distribution center, it can be quickly checked-in using the bar coded shipping label.

Figure 5:
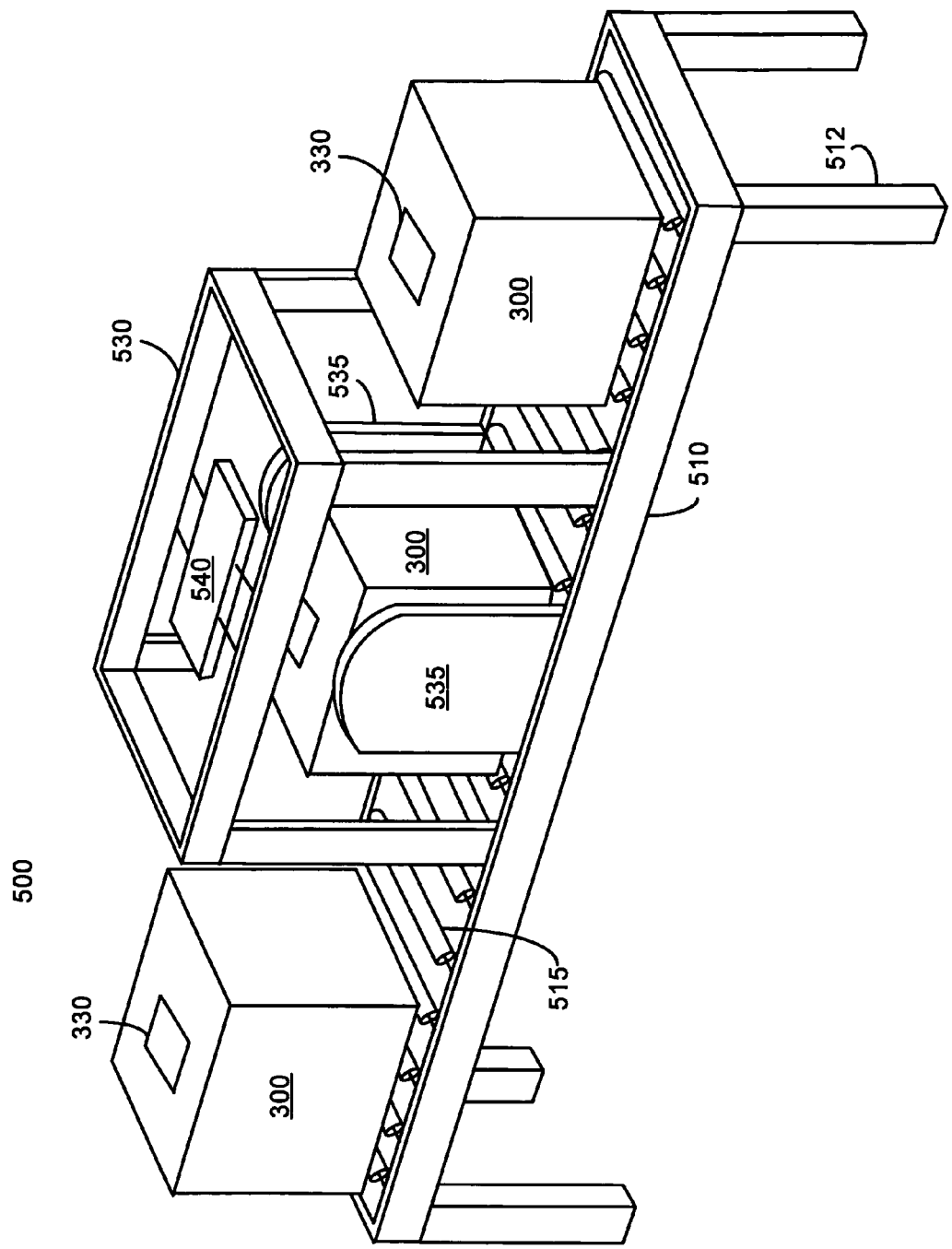
FIG. 5 is a perspective view of a surgical instrument shipping tote identification system according to various exemplary embodiments of this invention.
Figure 6:
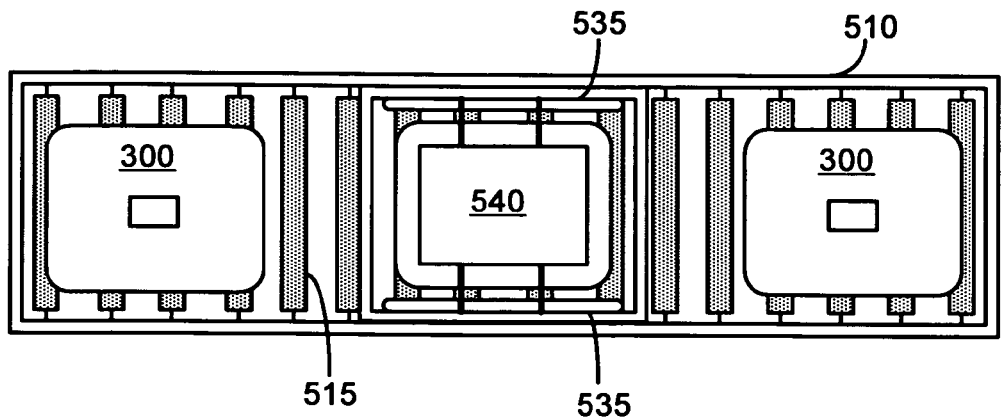
FIG. 6 is an overhead view of a surgical instrument shipping tote identification system according to various exemplary embodiments of this invention.
Figure 7:
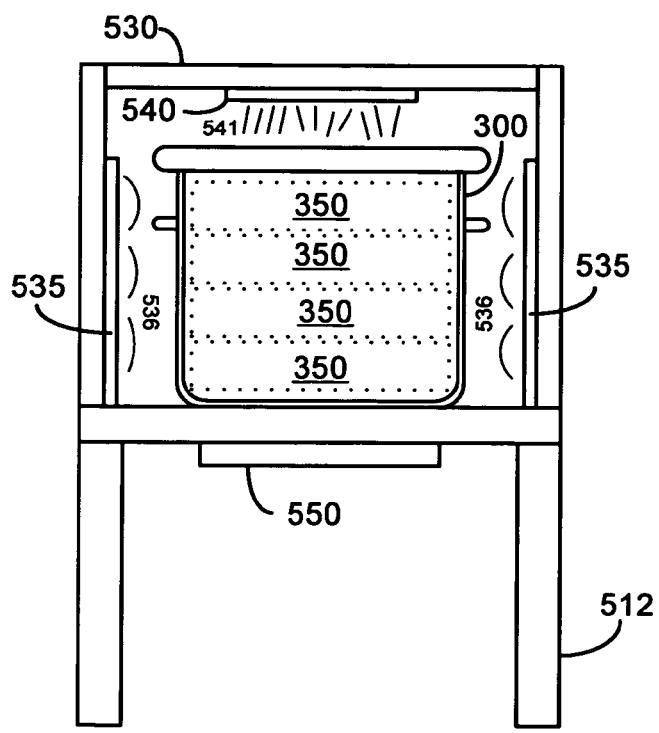
FIG. 7 is a end view of a surgical instrument shipping tote identification system according to various exemplary embodiments of this invention.

FIGS. 5–7 illustrate various different views of a surgical instrument tray and shipping tote identification apparatus 500 (hereinafter referred to as 'the identification apparatus') according to various exemplary embodiments. As illustrated in FIGS. 5–7, the identification apparatus 500 comprises an elevated chassis 510 supported by four or more legs 512. A conveyor system, comprising a series of rollers 515 mounted to the frame 510 defines a conveyor path along the length of the chassis 510. Though rollers 515 are illustrated in FIGS. 5–7, it should be appreciated that other conveyor means, such as a conveyor belt, may be substituted for the rollers 515.

A reading station 530 is mounted to the chassis 510 and may consist of, for example, a frame supporting a downward looking bar code reader 540 and a pair of RF transceiver antennae 535. The rollers 515 convey a shipping tote 300 to the reading station 530, where both the RF transceivers 535 and the bar code reader 540 are activated to read information from the shipping tote label 330 and the transponder tag attached to each surgical instrument tray within the tote. By mounting the bar coded shipping label on the top of each shipping tote and dimensioning the chassis so as to slightly exceed the width of a tote, read operations can be consistently performed by the bar code reader without requiring an operator to manually position the label 330 under the reader 540. Moreover, as noted above, because RF waves can penetrate surfaces impervious to light, the oppositely mounted RF antennae 535 will create sufficient RF field strength to activate any RFID tags associated with instrument trays residing within the shipping tote 300 when it enters the reading station 530. In the embodiments illustrated in FIGS. 5–7, when the shipping tote 300 enters the reading station 530, RF waves 536 emitted by the RF transceiver antennae 535 penetrate the tote 300 from opposing sides with respect to the direction of the conveyor system. Nearly simultaneous to this, light waves 541 from the bar code reader 540 are emitted approximately downwards onto the bar coded shipping label 330 attached to the top surface of the tote 300 to create a reflection pattern discernable by the bar code scanner. A control circuit (not shown) encased in a lower housing 550 contains the control logic for activating the bar code scanner 540 and the RFID transceiver 535 and for receiving inputs from these devices.

In alternative configurations to those illustrated in FIGS. 5–7, the bar code scanner 540 could be positioned either on the sides or underneath the reading station 530. Similarly, the RF antennae 535 could also be positioned orthogonal to one another rather than parallel, or more or less two antennae may be used.

During practical use, an operator will place a shipping tote 300 onto the conveyor system 515. The workstation apparatus 500 is activated either manually, by the operator, or through an automatic activation means such as a pressure sensor, a light sensor or other sensing means. Once activated both the bar code reader 540 and RFID reader 535 will remain activated until both have been able to successfully read information from the shipping tote 300. As the tote 300 enters the reading station 530, any RFID tags attached to surgical instrument trays stored in the shipping tote will become activated and emit a signal containing their stored information. Also, the bar code reader will read a reflection pattern representative of the information encoded in the bar coded shipping label 330. The controller in the lower unit 550 will receive this data and transmit it to a computer database stored in an external computer. The controller may send the data to the computer through a wired physical connection or through a wireless transmitter utilizing a suitable wireless protocol such as infra red, RF, BLUE TOOTH, 802.11x, etc. Methods for reading a plurality of RFID tags simultaneously are known in the art. In one such method, all incoming information signals are input into a memory device. Actual signals are identified by a leading bit pattern. When a signal is written into memory, the memory is first checked to determine if the particular value already exists. Once only duplicate signals are received after expiration of a certain time period, it is assumed that all signals have been read.

The external computer will enter the received data into a database and compare it against previous stored data to determine whether one or more conditions are satisfied. For example, the computer database may indicate, based on the shipping label information and the instrument tray identification information, that particular tote of instrument is scheduled for priority processing because it needs to be returned to the medical facility with expedited dispatch. Alternatively, the database may indicate that the particular tote is not scheduled for priority processing, but based on the length of service, one or more of the instrument trays in the tote are scheduled for routine inspection and/or maintenance. Still further, the database may indicate that there are no off-nominal conditions relating to the particular shipping tote and/or the instrument trays located inside. Any of these specific conditions or any other condition will require that the operator be notified so that the particular shipping tote may be handled appropriately. In order to facilitate this, the database program will cause the computer to send a signal back to the reading station controller 550 including such an indication. Also, the RFID transceivers 535 may write new data to the RFID transponder tags of each surgical instrument kit if they are configured as read and write tags, such as, for example, a date of processing.

Though not illustrated in FIGS. 5–7, the reading station 530 will preferably include an indicating means that is operable to provide an indication to the operator based on the indication provided by the database. As discussed above, this indication may be that processing should proceed as normal, that there is a problem with the current shipping tote, that the contents of the current shipping tote should be handled on an expedited basis, etc. In various exemplary embodiments, the indicator will comprise a visual indicator such as a panel of lights including, for example, a red light and a green light, whereby illumination of the red light indicates an off-nominal situation with respect to the current shipping tote, and illumination of the green light indicates that processing should consider as normal.

Alternatively to or in conjunction with a light panel, the visual indicator also may comprise a printer operable to print a label indicating a state of the current tote. The printer may be attached to a computer, attached to the reading station or simply in electrical communication with either the computer or the reading station. In various exemplary embodiments, the printer will be operable to print an indication that either processing for the current tote should be expedited, that processing should be set aside for inspection and/or maintenance, or that processing should proceed normally. This may be facilitated through printing or generating of different color stickers, through printing of a text message directly on a sticker, or through printing of a report detailing the specific state of the current shipping tote. The label or sticker will then be affixed to a surface of the shipping tote to alerts workers how to process the particular tote. In other exemplary embodiments, the indicating means will comprise an audio indicator. The audio indicator may comprise a speaker that emits one sound when processing should proceed normally and another sound when processing is off-nominal. The sounds may comprises single tones, alarms, or even voice recordings. Furthermore, the indicating means may consist of an audio indicator combined with a visual indicator. In various exemplary embodiments, activation of the indication means may cause the conveyor process to stop until the user inputs a command or acknowledges the indication.

As discussed above, the workstation apparatus of the present invention may be located in a distribution and/or processing center, sterilization-repackaging center or at a medical facility such as a hospital, so that incoming and/or outgoing shipping totes are run through the workstation apparatus and reading station so that they can be checked in and checked out of inventory and processed correctly. Alternatively, the workstation apparatus maybe may be located in a lab, university or clinical environment.

Figure 8:
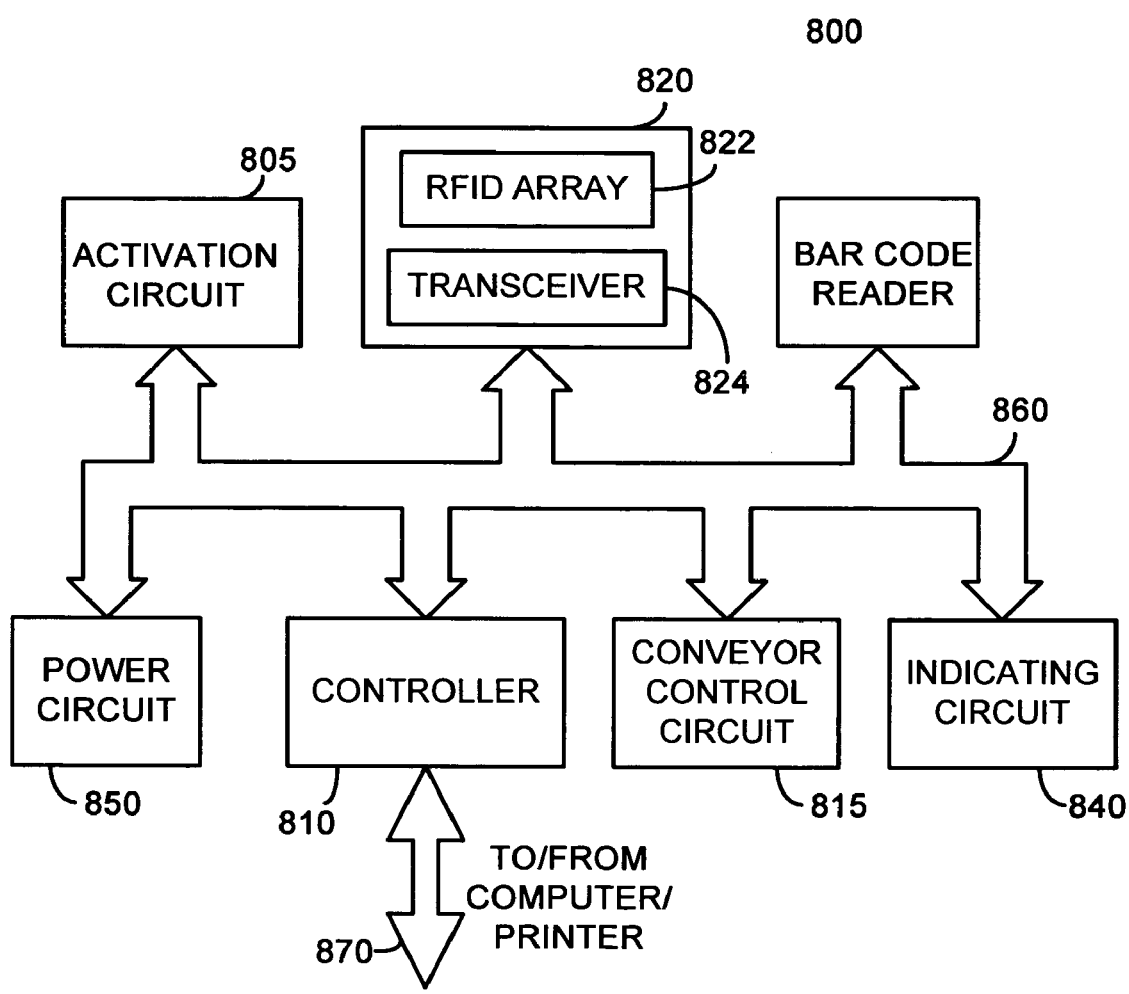
FIG. 8 is a block diagram illustrating various internal electronic components of a surgical instrument shipping tote identification system according to various exemplary embodiments of this invention.

FIG. 8 is a block diagram illustrating a circuit 800 comprising the various electrical components of the workstation apparatus reading station for surgical instrument trays and surgical instrument tray shipping totes according to various exemplary embodiments. The circuit 800 shown in FIG. 8 includes an activation circuit, a controller 810, an RFID reader 820 comprised of an RFID antennae array 822 and an transceiver 824, a bar code reader 830, an indicating circuit 840, a conveyor control circuit 814 and a power circuit 850 all interconnected by a power and signal bus 860. Also shown in the circuit 800 of FIG. 8 is a link 870 to an external computer. As discussed above, this link may be a physical wire connector or a wireless link. The controller 810 may be a multipurpose computer, a specific-purpose computer, an application specific integrated circuit (ASIC), a micro-controller, a digital signal processor, or other suitable processor or controller. The RFID antennae array 820 preferably include two-way antennae capable of generating an RF field signal, and of receiving signals from one or more RFID transponder tags activated by the RF field under the control of the transceiver 824. Any suitable bar code reading device may be utilized During operation, in response to the activation circuit 805 receiving a command to activate the system, the activation circuit sends a signal to the controller 810 over the bus 860. The controller 810 then sends a command to the conveyor control circuit 815 to activate the conveyor to transport the shipping tote to the reading station. Also, the controller 810 sends a command to the RFID reader 820 and the bar code reader 830 to turn on, causing an RF field to be generated by the reader 820 and a bar code light, usually a laser light, to be illuminated by the reader circuit 830. Once it has been determined, through the use of a sensor or other means, that the shipping tote has reached the reading station, the controller 810 sends a signal to the conveyor control circuit to pause the conveyor while the RFID reader 820 and the bar code reader 830 obtain data from the instrument kits and shipping tote respectively. Once data has been received by the RFID reader circuit 820 and the bar code reader circuit 830, these data are transferred over the bus 860 to the controller 810. The controller 810 then will pass this information to a computer database stored on a computer or other storage device through the external data link 870.

As discussed above, once the data from the shipping tote and instrument trays reaches the database, the data may be checked against stored data to determine if there are any status indicators for the particular shipping tote and/or instrument trays contained therein. For example, the data may be checked for any off-nominal status indicators. Once the data operations are completed, the external computer sends a signal back to the controller 810 through the external data link 870 indicative of the status of the current shipping tote. The controller 810 will then in turn send a signal to the indicating circuit 840 over the bus 860 based on the specific status indicated in the signal from the external computer. This may include an indication that the status is normal, that the status is high priority, that the status is abnormal, that the current shipping tote should be set aside for further processing, or other possible statuses. Regardless of the nature of the status sent by the controller 810, the indicator circuit 840 will specify through an indication means, an indication to the operator from the types of available indications so that the operator will know how to handle the current shipping tote. In various exemplary embodiments, if the a status of normal is indicated the controller 810 will cause the conveyor control circuit 815 to move the current shipping tote out of the reading station.

Figure 9:
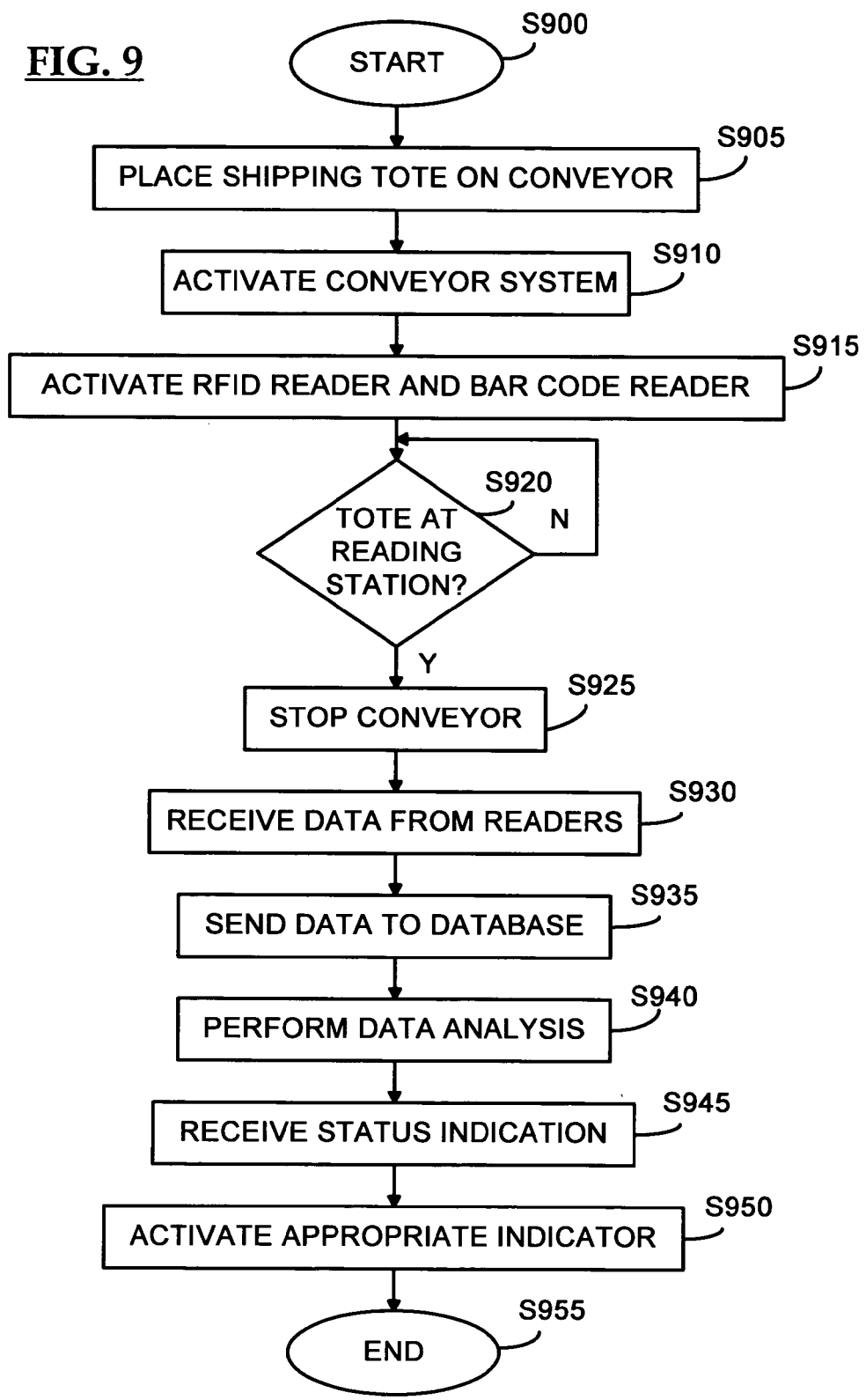
FIG. 9 is a flow chart detailing a method for checking in a surgical instrument kit shipping tote with a surgical instrument kit shipping tote identification system according to various exemplary embodiments.

FIG. 9 is a flow chart detailing a method for checking-in and/or checking-out a surgical instrument kit shipping tote with a surgical instrument kit shipping tote identification system according to various exemplary embodiments. Operation of the method begins in S900 and proceeds to S905 where a shipping tote is placed on the conveyor system of the shipping tote identification system. Then, in S910, either manually or automatically, the conveyor system becomes activated. Activation can be effected manually by flipping a switch, depressing a button, or other manual activation means, or though an automated means such as a pressure sensor, light sensor, etc. Typically, activation will cause the conveyor system to engage and to transport the surgical instrument tray shipping tote along the conveyor path to the reading station.

Next, in S915, after the shipping tote begins to travel along the conveyor path, both the RFID reader and bar code reader become activated. This means that the RF antennae will generate an RF field over a portion of the conveyor path and the bar code reader will generate a light for generating a reflection pattern from a bar coded label. Operation of the method then proceeds to S920, where a determination is made whether the shipping tote has entered the reading station. If not, then operations continues as before until presence of the shipping tote is detected. Otherwise, if in S920 it is determined that the shipping tote is in the reading station, operation proceeds to S925, where the conveyor system is stopped, slowed, or temporarily paused at a position to allow reading of the bar code label and any RFID transponder tags from the shipping tote. Alternatively, the shipping tote may proceed through the reading station without stopping or pausing.

When the presence of the shipping tote has been detected in the reading station, the conveyor system is preferably, but not necessarily stopped in S915 while information is obtained from the shipping tote. Both the bar code reader and RFID transceiver will remain engaged until sufficient time has passed for all information to be received. In S930, data are received from both the RFID transceiver and the bar code reader. Then, in S935, the data are sent by a controller to an external database. Next, in S940, data analysis is performed on the data for the current shipping tote based on information stored in the database. Data corresponding to the current shipping tote are analyzed for any off-nominal status indicators.

Once the data analysis is complete, operation of the method proceeds to S945, and a response is received by the controller from the external computer database indicative of the status of the current shipping tote. Finally, in S950, based on the received response, the appropriate indicator is activated to alert the operator as to the processing status of the current shipping tote. Operation of the method ends in S955.

Figure 10:
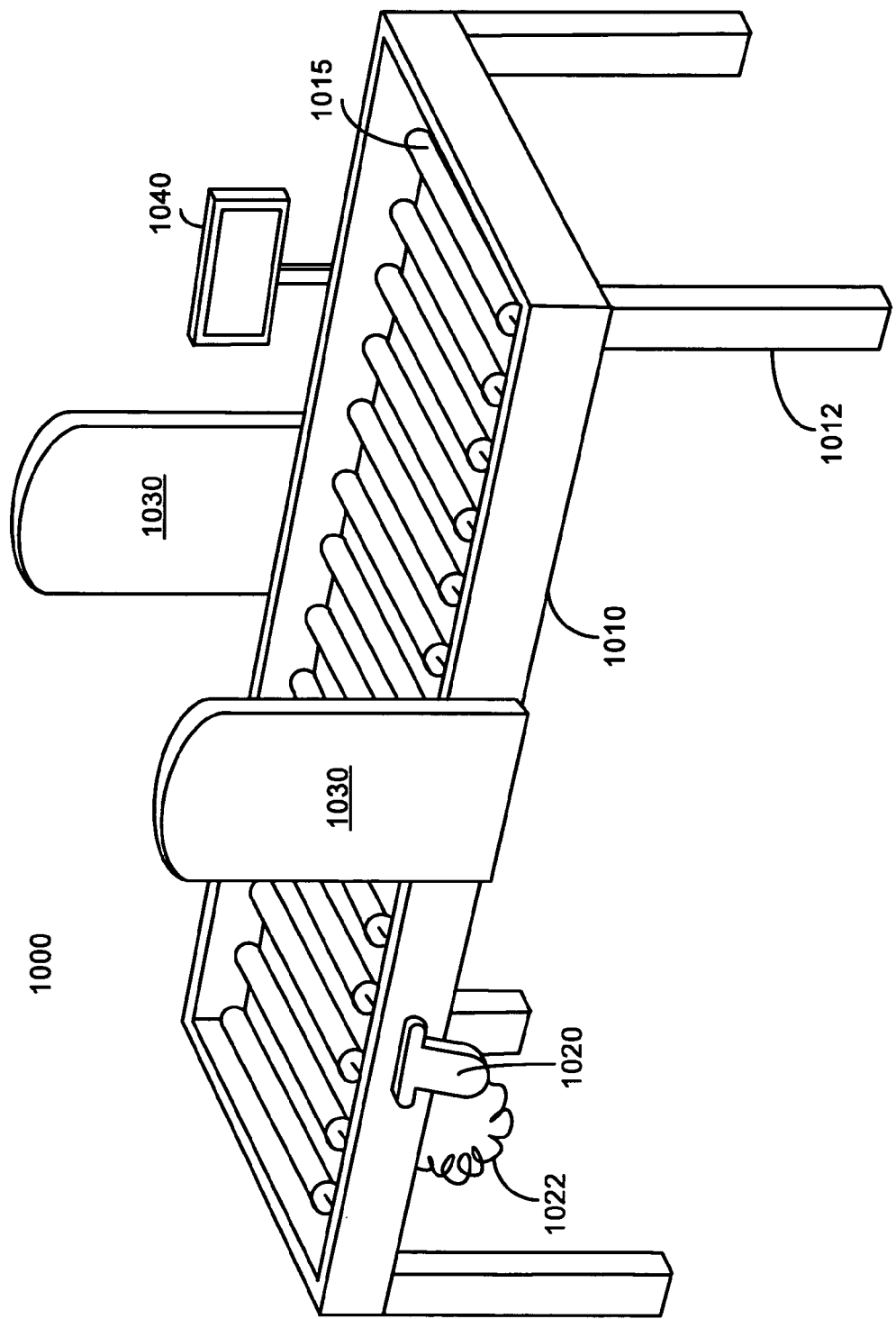
FIG. 10 is a perspective view of a surgical instrument shipping tote identification system according to additional exemplary embodiments of this invention.

Referring now to FIG. 10, FIG. 10 is a perspective view of a surgical instrument shipping tote identification system 1000 according to additional exemplary embodiments of the invention. The system 1000 comprises a chassis 1010 supported by four or more legs 1012, a hand held bar code reader 1020. The bar code reader 1020 is illustrated in FIG. 10 as being attached to the system 1000 by a cord 1022. However, the bar code reader 1020 may also communicated wirelessly with the system 1000. The system 1000 also comprises a series of conveyor rollers 1015 supported by the chassis and defining a path of travel along the length of the chassis. A pair of RFID transceiver antennae 1030 are placed along the path of travel. Also, a visual indicator 1040 is mounted on one portion of the chassis 1040 and is operable to display a visual cue to an operator indicating how the current shipping tote should be processed. For example, this may include an indication that processing should proceed as normal, processing should proceed on an expedited basis, or processing should be interrupted for an exception handling routine. Exception handling status may be indicated if there is a problem with one or more of the surgical instrument kits such as missing kit, a kit in need of a scheduled maintenance or repair, or other exception/error processing. Though not shown, an additional hand held RFID reader device may also be included with the system to handle cases where the RFID transceiver antennae 1030 are unable to successfully read RFID transponder tags associated with surgical instrument kits contained within a shipping tote.

FIG. 11 is a flow chart detailing the steps of a method for checking in a surgical instrument kit shipping tote a with a surgical instrument kit shipping tote identification system, such as, for example, the system 1000 shown in FIG. 10, according to various exemplary embodiments. Operation of the method starts in S1100 and proceeds to S1105 where the shipping tote is placed on the conveyor system. Then, in S1110, using a hand held bar code reader device, the operator scans a bar code shipping label affixed to the shipping tote to initiate the process. Next, in S1115, the information received by the bar code reader is sent to an external data processor. As discussed above in the context of FIG. 5, this information may be sent through a wired data link or one of various known wireless data links.

Once the information is received at the data processor, the bar code data is matched with stored data for identifying the current shipping tote. Then, in S1120, a set status is received from the data processor to the identification system. Next, in S1125, a cue is provided to the operator to send the tote to the RFID reader station. This cue may comprise an audio cue such as a sound or recorded voice signal, a video cue such as a light or visual message, or combinations of both. Alternatively, the conveyor system may automatically convey the shipping tote the RFID reader station. In a preferred embodiments, no other shipping totes may be scanned with the bar code scanner until RFID processing is complete.

Once the shipping tote has reached the RFID reader station along the conveyor path, any RFID tags associated with the surgical instrument kits contained in the tote are read in S1130. In S1135, the read information is sent in a manner analogous to S1115 to the data processor. This information, in combination with the information from the shipping label is used by the data processor to determine the status of the current shipping tote. Once all data processing steps are completed, operation of the method proceeds to S1140 where a status signal is received by the identification system from the data processor. Then, in S1145, the appropriate visual cue is activated to indicate to the user how the current shipping tote should be processed. In various exemplary embodiments, the visual cue will consist of a message on an attached display screen. In various other exemplary embodiments, this message will consist of illumination of a labeled LED including text labels such as normal, expedited and error. Alternatively still, the indication may also include a printed report produced on an attached or remote printer device. Finally, in S1150, the operator processes the current shipping tote based on the visual cue of S1145. Operation of the method terminates in S1155 and additional shipping totes may then be processed in a manner analogous to that discussed above.

While the foregoing description includes many details and specificities, it is to be understood that these have been included for purposes of explanation only, and are not to be interpreted as limitations. Many modifications and equivalent substitutions to the embodiments described above can be made without departing from the spirit and scope of the invention.

What is claimed:

1. An apparatus for identifying surgical instrument trays and surgical instrument tray shipping totes, comprising:
    a chassis;
    a conveyor system defining a path of travel supported by the; and
    a reader station attached to the chassis by a frame and comprising an RFID transceiver, a bar code reader, a control circuit and an indicator, wherein the bar code reader is configured to read a bar coded shipping label on an instrument tray shipping tote, the RFID transceiver is configured to read information from an RFID tag associated with instrument tray in the tote, and the control circuit is configured to perform a comparison between information read from the bar coded shipping label and the RFID tag with stored information and to activate the indicator in response to this comparison.

2. The apparatus of claim 1, wherein the conveyor system is selected from a conveyor belt or a plurality of conveyor rollers.

3. The apparatus of claim 1, wherein the RFID transceiver comprises at least one RF antenna configured to generate a RF field and to receive signals emitted from RFID transponder tags within the field.

4. The apparatus of claim 1, further comprising a data bus for communicating data from the RFID transceiver and the bar code reader to a computer system.

5. The apparatus of claim 4, wherein the data bus comprises a wireless data channel.

6. The apparatus of claim 4, wherein the data bus comprises a wired data channel.

7. The apparatus of claim 4, wherein the indicator comprises an indicator selected from the group consisting of a visual indicator, an audible indicator a printed indicator message, and mixtures thereof.

8. The apparatus according to claim 1, wherein the controller comprises means for activating the indicator based on a determined that at least one predetermined condition has been satisfied.

9. The apparatus according to claim 8, wherein the determination comprises comparing information obtained by the RFID reader and the bar code reader with previously stored information.

10. A method for identifying surgical instrument trays and surgical instrument tray shipping totes comprising:
    placing a surgical instrument tray shipping tote containing one or more surgical instrument trays on a conveyor system;
    activating an RFID reader to read information from at least one RFID transponder tag associated with each of the one or more surgical instrument trays contained in the shipping tote;
    activating a bar code reader to read information from a bar-coded shipping label affixed to a surface of the shipping tote;
    comparing the information read by the RFID reader and the bar code reader with previously stored information; and
    activating an indicator based on the step of comparing.

11. The method according to claim 10, the step of activating an RFID reader comprising generating an RFID field over a portion of the conveyor system with one or more RF antennae so as to automatically energize any RFID transponder tags passing within the portion of the conveyor system and reading information from the energized RFID transponder tags.

12. The method according to claim 10, the step of activating a bar code reader comprising activating a bar code reader positioned above the surface of the shipping tote to which the bar-coded shipping label is affixed.

13. The method according to claim 10, the step of comparing comprising sending the information read by the RFID reader and the bar code reader to a computer system, comparing the information with information stored in a database, and receiving a signal from the computer system indicative of a result of the comparison.

14. The method according to claim 13, the step of sending comprising sending the information over a physical data channel.

15. The method according to claim 13, the step of sending comprising sending the information over a wireless data channel.

16. The method according to claim 13, the step of activating an indicator based on the step of comparing comprising activating an indicator corresponding to the result.

17. The method according to claim 13, the step of activating an indicator comprising activating an indicator chosen from the group consisting of a visual indicator, an audio indicator, an printed indicator and mixtures thereof.

18. A method of identifying surgical instrument kits comprising:
affixing a bar-coded shipping label to a surface of a surgical instrument shipping tote containing one or more surgical instrument kits each surgical instrument kit comprising at least one RFID transponder tag;
placing the surgical instrument shipping tote on a conveyor system;
operating the conveyor system to move the shipping tote past an RFID transceiver and a bar code reader at a reading station;
obtaining first identification information from the RFID reader when the tote enters the reading station;
obtaining second identification information from the bar code reader corresponding to the shipping tote and its contents;
comparing the obtained first and second identification information with previously stored information; and
activating an indicator based on the results of the comparison.

19. The method according to claim 18, the step of obtaining first identification information comprising energizing each RFID transponder tag contained in the tote with an RFID transceiver with one or more RF antennae and receiving a signal from each energized tag containing the first identification information.

20. The method according to claim 18, the step of obtaining second identification information comprising illuminating the bar-coded label with a bar code scanner and obtaining a signal including the second identification information.

21. The method according to claim 18, the step of comparing comprising communicating the first and second identification information to a computer system through a communications channel, comparing the first and second identification information with information stored at the computer system, and receiving a signal from the computer system over the communications channel indicative of the results of the comparison.

22. The method according to claim 21, the step of communicating the first and second identification information through a communications channel comprising communicating the information through a physical communications channel.

23. The method according to claim 21, the step of communicating the first and second identification information through a communications channel comprising communicating the information through a wireless communications channel.

24. The method according to claim 21, the step of activating an indicator based on the results of the comparison comprising activating an indicator chosen from the group consisting of a visual indicator, an audio indicator, an printed indicator and mixtures thereof.

25. A method for identifying the status of a surgical instrument kit shipping tote and surgical instrument kits residing therein with a surgical instrument shipping kit and surgical instrument kit shipping tote identification system comprising:
scanning a bar coded shipping label comprising encoded information associated with a surgical instrument shipping tote with a hand held bar code scanner;
transferring the encoded information received by bar code scanner to a data processor over a communication link of the identification system to matched with surgical instrument kits associated with that encoded information;
receiving a response from the data processor indicating that the encoded information has been received;
conveying the shipping tote to an RFID reader station along a conveyor path of the identification system;
reading information from at least one RFID transponder tag associated with at least one surgical instrument kit contained within the shipping tote;
transferring the information read from the at least one RFID transponder tag to the data processor;
receiving a signal indicative of a processing status of the current shipping tote; and
displaying a visual cue indicative of the processing status of the current shipping tote.

26. The method according to claim 25, wherein the information read from the at least one RFID transponder tag comprises identification information for the surgical instrument kit that the tag is associated with.

27. The method according to claim 25, wherein said processing status comprises a status selected from the group consisting of normal processing, expedited processing, and exception/error processing.

* * * * *